United States Patent
Falace et al.

(10) Patent No.: US 6,891,695 B1
(45) Date of Patent: May 10, 2005

(54) COMPACT TAPE DRIVE FOR READING AND WRITING DATA ON SINGLE REEL MAGNETIC TAPE CARTRIDGES

(75) Inventors: Joseph Philip Falace, Louisville, CO (US); Wayne Richard Hemzacek, Westminster, CO (US); David Thomas Hoge, Westminster, CO (US); Clark Milo Janssen, Loveland, CO (US); Donovan Milo Janssen, Boulder, CO (US); Donald Wayne Selg, Westminster, CO (US); John Sam Todor, Westminster, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/112,242

(22) Filed: Jul. 8, 1998

(51) Int. Cl.$^7$ .............................................. G11B 5/027
(52) U.S. Cl. ...................................................... 360/85
(58) Field of Search ............................. 360/84, 85, 95

(56) References Cited

U.S. PATENT DOCUMENTS 4,792,871 A * 12/1988 Hutter .......................... 360/85
5,128,815 A    7/1992 Leonhardt et al. ............ 360/85

* cited by examiner

Primary Examiner—George J. Letscher
(74) Attorney, Agent, or Firm—Wayne P. Bailey

(57) ABSTRACT

A compact tape drive for reading and writing data on single reel magnetic tape cartridges. The compact tape drive has a tape threading mechanism that extracts the leader block from the magnetic tape cartridge and threads the leader block into a takeup reel that is located juxtaposed to the loaded magnetic tape cartridge. A separate magnetic tape wrap mechanism having a plurality of cooperatively operative tape wrap arms is also provided to position the magnetic tape around a set of tape guides and the read/write head. The magnetic tape wrap mechanism functions both to thread the magnetic around the takeup reel, spanning the space in front of the read/write head, and then to wrap the magnetic tape around the read/write head. In addition, the tape elevator, electronics and other standard tape drive assemblies are included in a predefined volume.

18 Claims, 3 Drawing Sheets

COMPACT TAPE DRIVE FOR READING AND WRITING DATA ON SINGLE REEL MAGNETIC TAPE CARTRIDGES

FIELD OF THE INVENTION

This invention relates to tape drives and, in particular, to an apparatus that implements a magnetic tape threading mechanism for threading the magnetic tape from the single reel magnetic tape cartridge into the takeup reel and a separate magnetic tape wrap mechanism for transporting the threaded magnetic tape into position against the data read/write head, wherein the tape drive is implemented in a compact space, such as a 5¼ inch by 8 inch form factor.

Problem

It is a problem in the field of data processing systems to provide an apparatus to efficiently store data on a data recording medium while working within the constraints imposed by the industry standard data storage media, data storage formats, tape drive architectures, and tape drive form factors. This is especially a problem in the case of adapting single reel leader block based magnetic tape cartridge tape drive mechanisms to a small form factor to conserve space. The magnetic tape threading mechanisms that are typically used in the magnetic tape cartridge tape drives are typically complex and consume a significant amount of space in the tape drive. In particular, a single reel magnetic tape cartridge has a leader block attached to one end of the magnetic tape that is housed therein. A tape threading mechanism threads the leader block end of the magnetic tape from the magnetic tape cartridge to a takeup reel that is permanently mounted in the tape drive over a predefined tape threading path that includes the read/write head as well as a plurality of bearings to guide the magnetic tape. The takeup reel includes a slot for receiving the leader block and is connected to a drive motor for transporting the tape between the takeup reel and the magnetic tape cartridge. In order to follow the complex tape threading path, existing tape drives use a jointed tape threading arm, whose path is determined by a cam track. The cam track has a beginning point for positioning a longitudinal cam member into engagement with the leader block that is exposed through an opening in the magnetic tape cartridge. The tape threading arm is connected at one end to the longitudinal cam member and at the other end to a servo controlled drive motor. The drive motor activates the tape threading arm to transport the longitudinal cam member from the end of the cam track, where it engages the leader block, to a slot in the takeup reel, the magnetic tape through the tape threading path as it traverses this path. Due to the complex nature of the tape threading path, a servo mechanism controls the tape threading arm operation to pull the magnetic tape at a constant speed and provide a constant tension on the tape as it is being withdrawn from the magnetic tape cartridge and transported to the takeup reel. The problem with this architecture is that the tape threading mechanism occupies a significant amount of space in the tape drive, is mechanically complex and costly.

In contrast, the helical scan data read/write technology that is based on the video data storage industry, uses a dual reel magnetic tape cassette as the data storage medium. The magnetic tape cassette contains both the source reel and the takeup reel, located juxtaposed to each other and rotatably mounted on associated spindles. When the magnetic tape cassette is loaded in the tape drive, the tape drive magnetic tape loading mechanism withdraws a length of the exposed magnetic tape from the magnetic tape cassette and wraps the magnetic tape around the rotary read/write head. When the magnetic tape is in this position, the drive motors transport the magnetic tape from the source reel to the takeup reel over the read/write head, and data can be read from or written to the magnetic tape. While the tape wrap mechanism in this tape drive is simple and inexpensive, the tape drive occupies a significant amount of space. In particular, the width of the tape drive is greater than the width of a dual reel tape cassette in order to enable the wrapping of the magnetic tape about the associated rotary heads. The use of this amount of horizontal space is costly, especially in the environment of automated cartridge library systems that robotically store and retrieve magnetic tape cartridges. The minimization of the space required for the tape drive in an automated cartridge library system increases the storage capacity of the system, thereby reducing the per magnetic tape cartridge storage cost.

The integration of these two above-noted tape drive technologies into a rotary head based single reel magnetic tape cartridge tape drive is illustrated in U.S. Pat. No. 5,128,815 wherein an interface is used to present the magnetic tape cartridge to the rotary head mechanism in a manner that emulates the magnetic tape cassette media. This is accomplished by providing a takeup reel that is permanently mounted in the tape drive and positioned with respect to the magnetic tape cartridge in a relationship that substantially mimics the format of the magnetic tape cassette. A short tape threading arm is used to retrieve the leader block end of the magnetic tape from the magnetic tape cartridge and thread the magnetic tape over a short tape threading path to the takeup reel. Once the leader block is inserted into the takeup reel, a rotary head tape wrap mechanism transports the exposed length of magnetic tape, that extends from the magnetic tape cartridge to the takeup reel, to the rotary heads that are located in a position with respect to the magnetic tape cartridge and takeup reel to be compatible with the tape cassette mode of operation. However, while the tape threading and the tape wrap mechanisms in this tape drive are simple and inexpensive, the tape drive occupies a significant amount of space. In particular, the width of the tape drive is greater than the width of a dual reel tape cassette in order to emulate this format for the associated rotary heads in spite of the fact that only a single reel magnetic tape cartridge is processed by this tape drive.

It is therefore desirable in single reel magnetic tape cartridge tape drives to package the mechanisms that comprises the tape drive into the minimum volume and more particularly minimum width and height dimensions. Within this predefined volume, a tape threading mechanism must extract the leader block from the magnetic tape cartridge and load the leader block into a takeup reel while also positioning the magnetic tape around a set of tape guides and the read/write head. In addition, the tape elevator, electronics and other standard tape drive assemblies must be included in the predefined volume. The implementation of these mechanisms is preferably achieved within a 5¼ inch by 8 inch form factor. However, this concept can be used with other tape drive form factors to minimize the space required and to provide a longer tape path. This permits the use of a thinner magnetic tape which in turn permits the use of a greater length of magnetic tape on the tape reel, thereby providing greater data storage capacity.

Solution

The above described problems are solved and a technical advance achieved by the present compact tape drive for reading and writing data on single reel magnetic tape cartridges that functions to implement the tape drive in a minimum predefined volume. The compact tape drive comprises a tape threading mechanism that extracts the leader block from the magnetic tape cartridge and loads the leader block into a takeup reel that is located juxtaposed to the loaded magnetic tape cartridge. The read/write head is located adjacent to the takeup reel and the loaded magnetic tape cartridge. A separately operable magnetic tape wrap mechanism comprising a plurality of cooperatively operative tape wrap arms is also provided to position the magnetic tape around a set of tape guides and the read/write head. The magnetic tape wrap mechanism functions both to thread the magnetic tape around the takeup reel, spanning the space in front of the read/write head, and then to wrap the magnetic tape around the read/write head. In addition, the tape elevator, electronics and other standard tape drive assemblies are included in the predefined volume, preferably comprising a 5¼ inch by 8 inch form factor.

DETAILED DESCRIPTION

Figure 1:
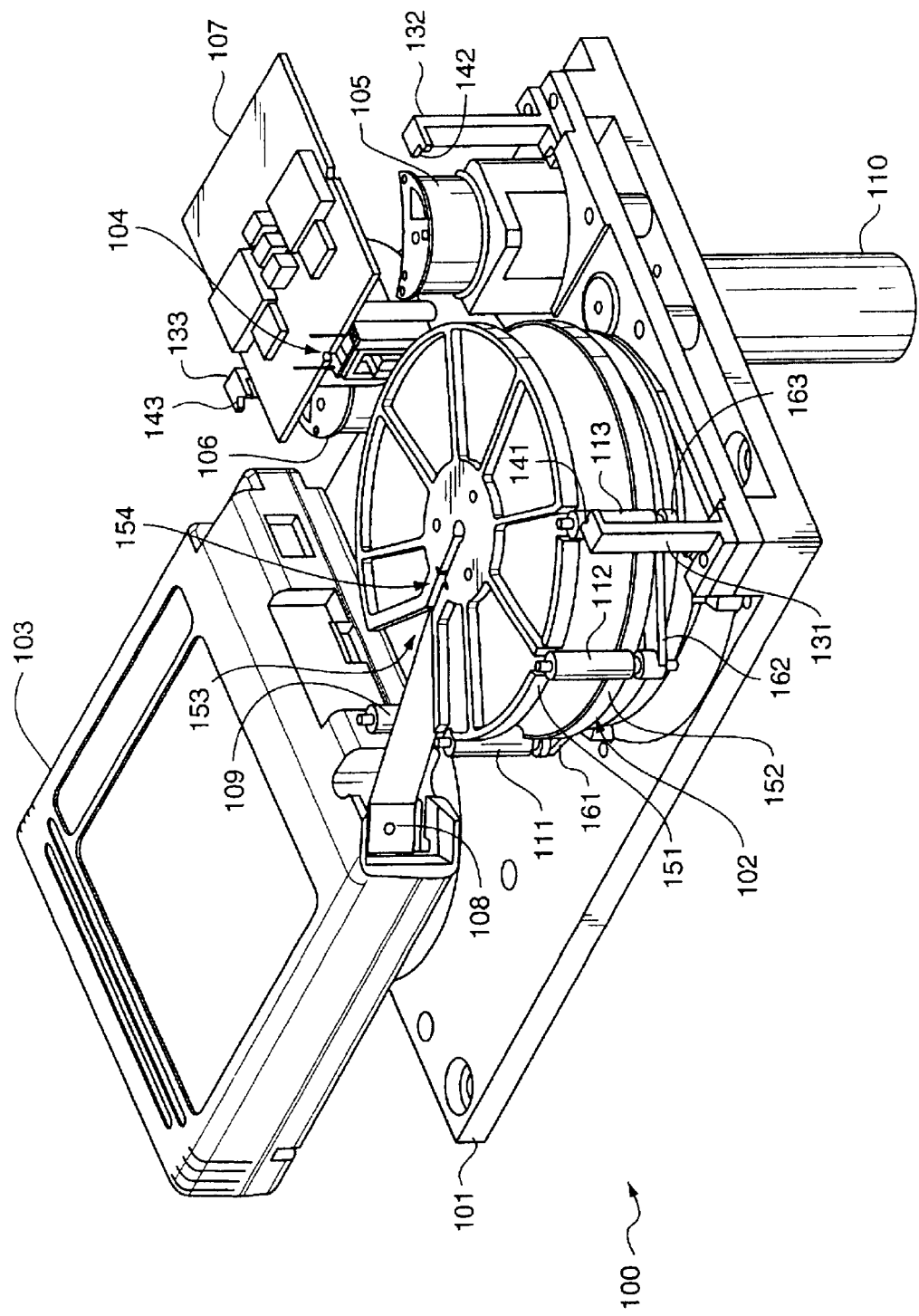
FIG. 1 illustrates in perspective view the architecture of the present compact tape drive for reading and writing data on single reel magnetic tape cartridges in the magnetic tape cartridge loaded, leader block threaded, and tape ready to wrap mode.
Figure 2:
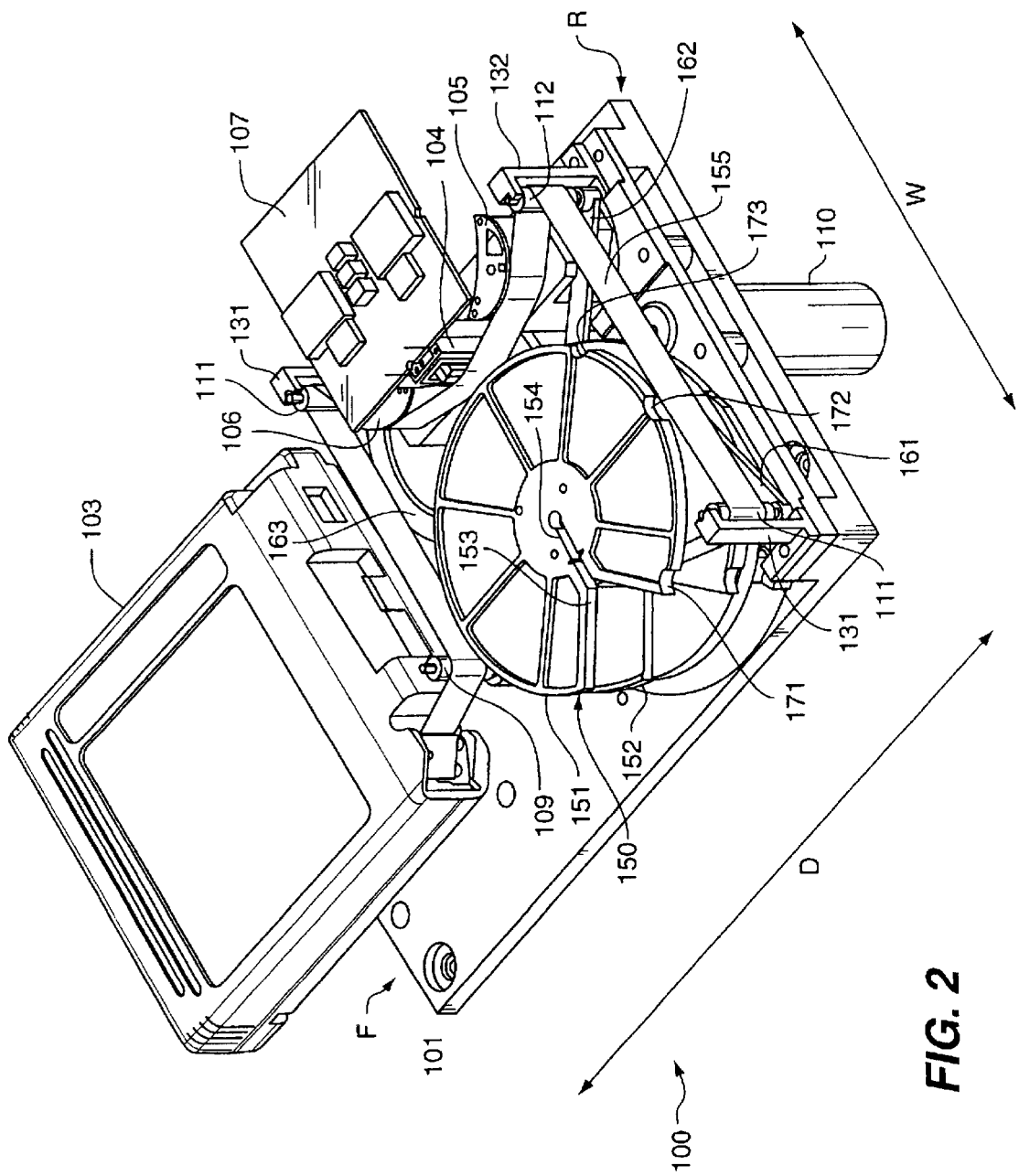
FIG. 2 illustrates in perspective view the architecture of the present compact tape drive for reading and writing data on single reel magnetic tape cartridges in the magnetic tape cartridge loaded and tape wrapped mode.

FIGS. 1 and 2 illustrate in perspective view the architecture of the present compact tape drive for reading and writing data on single reel magnetic tape cartridges in the magnetic tape cartridge loaded, tape ready to wrap mode and tape wrapped mode, respectively. The tape drive 100 comprises a frame 101, having a width dimension W (not greater than 5¼") and a depth dimension D (not greater than 8"), on which is mounted the various mechanisms that implement the tape drive functionality. The tape drive 100 has a front side F into which a magnetic tape cartridge 103 is loaded and a rear side R. A takeup reel 150 is rotatably mounted on the frame 101, located proximate a first side (rear R) of the depth dimension and proximate a first side of the width dimension W. Thus, the takeup reel 150 is located at the far back corner of the tape drive 100. In addition, the data the data read/write apparatus comprising hydrodynamic or roller tape guides 105, 106 and read/write head 104 are located on frame 101, located proximate a first side (rear R) of the depth dimension and proximate a second side of the width dimension W, where the second side of the width dimension is on the opposite side of the frame from the first side of the width dimension. Thus, the takeup reel 150 and data read/write apparatus are located at opposite far back corners of the tape drive 100.

The tape drive 100 includes a tape elevator mechanism (not shown for simplicity of illustration) located at the front side F of the frame 101 that functions in well known fashion, to receive a magnetic tape cartridge 103 and position the received magnetic tape cartridge 103 on the tape reel drive spindle (not shown) to enable the tape drive motor to rotate the single reel located in the magnetic tape cartridge 103 to wind/unwind the magnetic tape 155 housed in the magnetic tape cartridge 103. In addition, drive electronics circuit board 107 is mounted above the read/write head 104.

Single Reel Magnetic Tape Cartridge

A 3480-type magnetic tape cartridge 103 is an industry standard data storage element that comprises a housing having the exterior dimensions that are: width of 4¼ inches, length of 4⅛ inches, height of 15/16 inches. The exterior housing encloses a single tape reel having a diameter of 3¾ inches. This magnetic tape cartridge 103 has a front side that includes an opening through which the tape drive accesses the magnetic tape 155 contained therein. Access to the magnetic tape 155 is provided by means of a leader block 108 that is attached to one end of the magnetic tape 155 that is wound on the tape reel. The tape reel is equipped with a drive spindle open to the bottom side of the magnetic tape cartridge 103 and the drive spindle is formed to mate with a supply reel drive that is part of the tape drive 100 that receives the magnetic tape cartridge 103.

Takeup Reel

The takeup reel 150 comprises a spool-shaped structure that uses a substantially cylindrical shaped hub (not shown) that connects a cylindrical top plate 151 and a cylindrical shaped bottom plate 152, that form the rims of the spool. The magnetic tape 155 is wound on the hub by the action of a tape wrap mechanism drive motor 110 that functions to wind the magnetic tape 155 in clockwise fashion on the hub. The takeup reel 150 includes funnel-shaped apertures 153 that are formed in the top plate 151 and the bottom plate 152 to accommodate the leader block 108 and the associated tape threading arm. The shape of these apertures 153 functions to guide the leader block 108 into position as it traverses the length of the aperture 153 into an aperture 154 that is formed in the cylindrical wall of the hub to receive the leader block 108 as it is retrieved from the magnetic tape cartridge 103. The funnel shape of these apertures 153 compensates for any misalignment of the leader block 108, as carried by the tape threading arm, with the aperture that is formed in the cylindrical wall of the hub.

Figure 3:
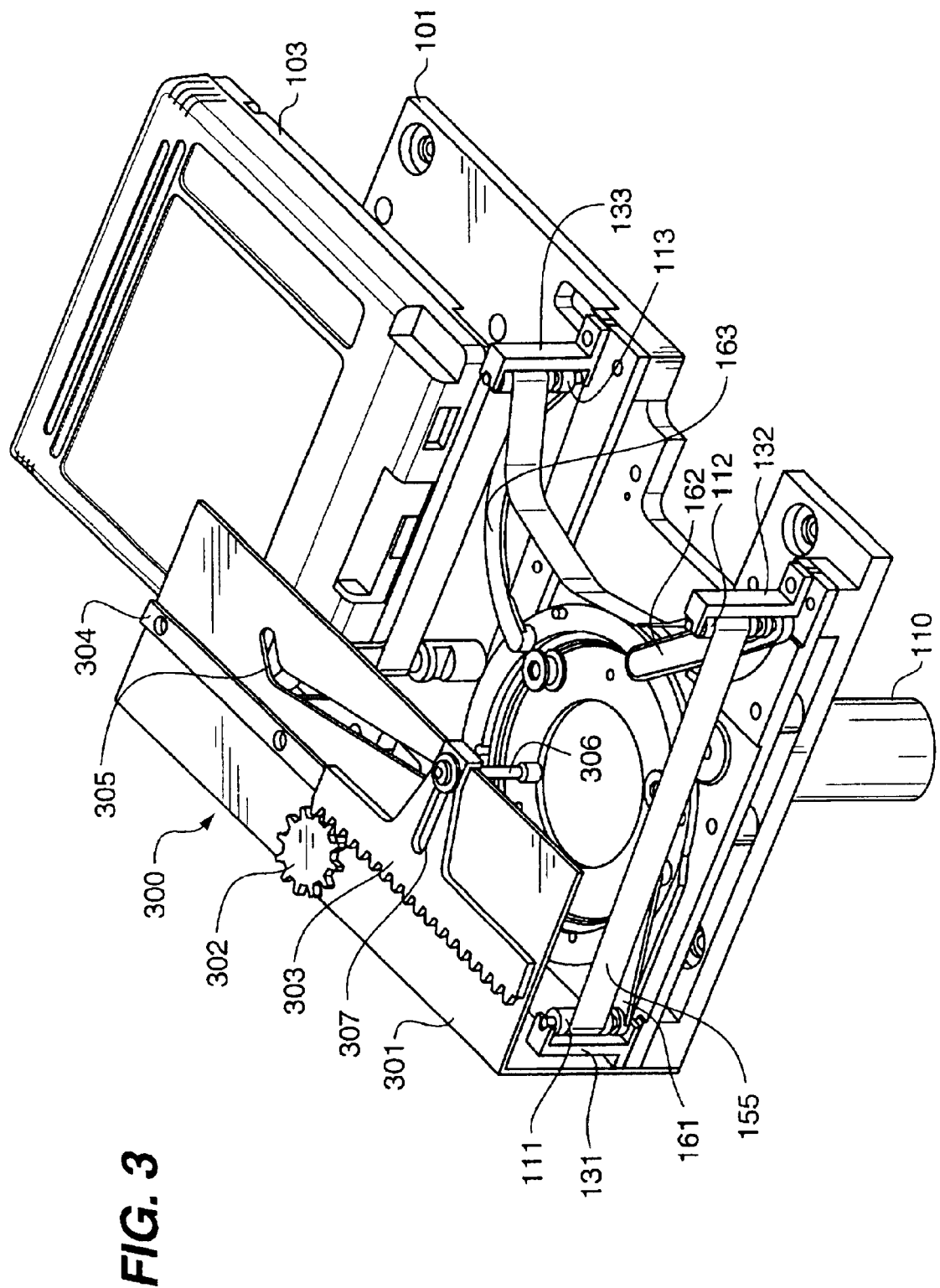
FIG. 3 illustrates in perspective view the tape threading mechanism used in the present compact tape drive for reading and writing data on single reel magnetic tape cartridges.

The takeup reel 150 is positioned in one corner of the tape drive 100 to maximize the space that is available for the magnetic tape cartridge 103 and the tape elevator that connects the magnetic tape cartridge 103 with the drive motor (not shown). This positioning of the takeup reel 150 in tape drive 100 substantially aligns the leader block opening formed in the magnetic tape cartridge 103 with the funnel-shaped aperture 153 formed in the top 151 and bottom 152 plates of the takeup reel 150. This configuration permits the use of a relatively linear tape threading path from the magnetic tape cartridge 103 to the takeup reel 150 and simplifies the tape threading mechanism as shown in FIG. 3.

Magnetic Tape Wrap Mechanism

The read/write head assembly 104 and the hydrodynamic tape path bearings 105, 106 are positioned next to the takeup reel 150. The tape wrap mechanism is located below the takeup reel 150 and consists of three arms 161–163 (more clearly seen in FIG. 3), each of which is equipped with a tape guide roller 111–113 mounted on the distal end thereof. The tape guide rollers 111–113 are each seated in a respective cutout 171–173 in the takeup reel top 151 and bottom 152 plates when in the staging mode. The tape threading arm engages the leader block 108 of the magnetic tape cartridge 103 and withdraws the leader block 108 from the magnetic tape cartridge 103, threading the magnetic tape 155 from the opening formed in the magnetic tape cartridge exterior housing to the aperture 154 formed in the hub of the takeup reel 150, where the leader block 108 is seated.

Once the leader block 108 is seated, the tape wrap drive motor 110 is activated and functions to rotate all three arms 161–1631 in a clockwise direction to engage the magnetic tape 155 that is exposed between the magnetic tape cartridge 103 and the takeup reel 150. Each of the three arms 161–163 follows its own path defined by a cam or track located on the underside of the tape drive during the rotation of the arms 161–163. The arms 161–163 and their associated tape guide rollers 111–113 serve to wrap the magnetic tap 155 from the magnetic tape cartridge 103, across fixed guide roller 109, past the read/write head 104, and finally to the takeup reel 150. As the first movable tape guide roller 111 rotates in the clockwise direction around the takeup reel 150, it engages the magnetic tape 155 and begins to wrap the magnetic tape 155 across the face of fixed tape guide roller 109. In synchronization with the movement of the first tape guide roller 111 and delayed in time, the second tape guide roller 112 rotates in the clockwise direction, following the path of the first tape guide roller 111, to engage magnetic tape 155 to prevent the magnetic tape 155 from wrapping around the hub of the takeup reel 150 as the first tape guide roller 111 pulls the magnetic tape 155 along the length of the magnetic tape cartridge 103 to the space between the takeup reel 150 and the data read/write apparatus. Similarly, in synchronization with the movement of the first tape guide roller 111 and the second tape guide roller 112 and delayed in time, the third tape guide roller 113 rotates in the clockwise direction, following the path of the first tape guide roller 111 and second tape guide roller 112, to engage magnetic tape 155 to prevent the magnetic tape 155 from wrapping around the hub of the takeup reel 150 as the first tape guide roller 111 pulls the magnetic tape 155 along the length of the magnetic tape cartridge 103 through the space between the takeup reel 150 and the data read/write apparatus to position the magnetic tape in front of the read/write head 104 and the hydrodynamic tape guides 105, 106. Finally, the first tape guide roller 111 completes its traverse in the position illustrated in FIG. 2. The second tape guide roller 112 and the third tape guide roller 113 are positioned by the movement of their associated arms 162, 163, respectively to transport the magnetic tape 155 away from the circumference of the takeup reel 150 toward the second edge of the width dimension W, one on either side of the data read/write apparatus, such that the magnetic tape 155 is wrapped around the hydrodynamic tape guides 105, 106 and the read/write head 104 that are located between the two hydrodynamic tape guides 105, 106.

The operation of the arms 161–163 creates the maximum length tape path between the reels and the tape guiding elements to thereby minimize tape wear and/or eliminate the possibility of tape edge buckling by reducing the forces that are applied to the tape edges. This allows the use of a thinner magnetic tape and thus a greater length of the magnetic tape can be placed on the tape reel, thereby providing greater data storage capacity. The tape guide rollers 111–113 are securely and accurately positioned at the final extent of travel of the associated arms 161–163 by the use of V-shaped notches 141–143 that are formed in the vertically oriented stops 131–133. Thus, the movable first and second tape guide rollers 111, 112 are translated by the operation of the associated arms 161, 162 from a first position located against the takeup reel 150 in the associated notches 171, 172 formed therein to a second position located at the first and second extreme edges, respectively, of the width dimension W at the extreme edge (rear edge R) of the depth dimension D. The third movable tape guide 113 is translated by the operation of the associated arm 163 from a first position located against the takeup reel 150 in the associated notch 173 formed therein to a second position located at the second extreme edge, of the width dimension W at the opposite side of the data read/write apparatus from the second movable tape guide roller 112.

Tape Threading Mechanism

FIG. 3 illustrates in perspective view the tape threading mechanism 300 as installed on the tape drive 100. The perspective view of FIG. 3 has been simplified in that the takeup reel 150, the read/write head assembly and tape elevator have been removed to more clearly illustrate the structure of the tape threading mechanism 300. The view of FIG. 3 illustrates the tape threaded mode, wherein the magnetic tape 155 has been extracted from the magnetic tape cartridge 103 and loaded into the takeup reel. The tape threading mechanism 300 includes a mounting plate 301 that is attached to the frame 101 of the tape drive 100 to support the operating mechanism of the tape threading mechanism 300. The tape threading mechanism 300 is powered by a drive motor (not shown) that drives the toothed pinon gear 302, which is rotatable to translate toothed rack 303 laterally along the guide rail 304. The rack 303 includes a slot 307 formed therein to enable tape threading pin 306 to move in a direction that is perpendicular to the length of guide rail 304. The mounting plate 301 also has a slot 305 formed therein to receive the lower end of the tape threading pin 306. In operation, the drive motor rotates the pinon gear 302 which causes the rack 303 to translate along the guide rail 304. The movement of the rack 303 along the guide rail 304 causes the tape threading pin 306 to follow the path defined by the slot 307, with the tape threading pin 306 freely moving within the slot 307 to thereby follow the path defined by slot 305. The tape threading pin 306 translates from an end of slot 305, that is located adjacent the magnetic tape cartridge 103 where it engages the leader block 108 of the magnetic tape cartridge 103, to the other end of slot 305 where the tape threading pin 306 seats the leader block 108 in the aperture formed in the hub of the takeup reel 150.

Summary

Thus, the compact tape drive combines a tape threading mechanism that extracts the leader block from the magnetic tape cartridge and threads the leader block into a takeup reel that is located juxtaposed to the loaded magnetic tape cartridge, with a separately operable magnetic tape wrap mechanism comprising a plurality of cooperatively operative tape wrap arms that position the magnetic tape around a set of tape guides and the read/write head. The magnetic tape wrap mechanism functions both to thread the magnetic tape around the takeup reel, spanning the space in front of the read/write head, and then to wrap the magnetic tape around the read/write head. This combination of cooperatively operative yet independent mechanisms enable the implementation of the tape drive in a 5¼ inch by 8 inch form factor.

What is claimed is:

1. A tape drive apparatus for reading and writing data on to a magnetic tape that is supplied in a removable tape cartridge, containing a single reel rotatably mounted within said magnetic tape cartridge, and having a leader block affixed to one end of said magnetic tape for use in withdrawing said one end from said magnetic tape cartridge, comprising:

means for receiving a magnetic tape cartridge;

takeup reel means, located adjacent said means for receiving and permanently mounted in said tape transport apparatus, having an aperture formed therein located substantially opposite said leader block when said magnetic tape cartridge is loaded in said means for receiving, for receiving said leader block;

read/write head means, located adjacent said takeup reel means, for reading and writing data on to said magnetic tape;

tape threading means for grasping said leader block to thread said magnetic tape along a substantially linear path from said magnetic tape cartridge directly to said takeup reel means by threading said leader block in said aperture; and tape wrap means for translating said threaded magnetic tape from said predetermined path at least 180° around a circumference of said takeup reel means to wrap about said read/write head means, wherein said tape wrap means comprises first movable guide means that is movable between a first position located juxtaposed to said takeup reel means and a second position located juxtaposed said takeup reel means along a path that guides said magnetic tape past said read/write head means.

2. The apparatus of claim 1 further comprising:

a first fixed guide means located adjacent to said means for receiving for supporting said magnetic tape in a predetermined position as it is translated by said tape wrap means.

3. The apparatus of claim 1 wherein said tape wrap means further comprises: second and third movable guide means that are movable between a first position located juxtaposed to said takeup reel means and a second position framing said read/write head means to wrap said magnetic tape, as guided past said read/write head means by said first movable guide means, about said read/write head means.

4. The apparatus of claim 1 wherein said tape threading means comprises:

tape threading pin means for engaging said leader block; and rack and pinon gear means for translating said tape threading pin means along a predetermined substantially linear path from said magnetic tape cartridge to said takeup reel means.

5. The apparatus of claim 4 wherein said tape threading means further comprises:

means for supporting said rack and pinon gear means in a predetermine position in said tape drive; and aperture means, formed in said means for supporting and receiving said tape threading pin means, for defining said predetermined path.

6. The apparatus of claim 1 wherein said tape wrap means comprises:

first movable guide means that is movable between a first position located juxtaposed to said takeup reel means and a second position located juxtaposed said takeup reel means along a path that guides said magnetic tape past said read/write head means.

7. A tape transport apparatus, having width and depth dimensions, for reading and writing data on to a magnetic tape that is supplied in a removable tape cartridge, containing a single reel rotatably mounted within said magnetic tape cartridge, and having a leader block affixed to one end of said magnetic tape for use in withdrawing said one end from said magnetic tape cartridge, comprising:

takeup reel means permanently mounted in said tape transport apparatus, located proximate a first extreme edge of said width dimension and proximate a first extreme edge of said depth dimension, having an aperture formed therein located substantially opposite said leader block when said magnetic tape cartridge is loaded in said tape drive, for receiving said leader block;

read/write head means, located proximate a second extreme edge of said width dimension and proximate a first extreme edge of said depth dimension, said second extreme edge of said width dimension being located opposite said first extreme edge of said width dimension, for reading and writing data on to said magnetic tape;

tape threading means for grasping said leader block to thread said magnetic tape along a substantially linear path from said magnetic tape cartridge directly to said takeup reel means by threading said leader block in said aperture; and tape wrap means for translating said threaded magnetic tape from said predetermined path along a tape wrap path to traverse a space between said takeup reel means and said read/write head means and thence to wrap about said read/write head means.

8. The apparatus of claim 7 wherein said width dimension is no greater than 5¼ inches.

9. The apparatus of claim 7 wherein said depth dimension is no greater than 8 inches.

10. The apparatus of claim 7 wherein said tape wrap means comprises:

first movable guide means that is movable between a first position located juxtaposed to said takeup reel means and a second position located juxtaposed said takeup reel means along a path that guides said magnetic tape past said read/write head means.

11. The apparatus of claim 10 wherein said tape wrap means further comprises:

second and third movable guide means that are movable between a first position located juxtaposed to said takeup reel means and a second position framing said read/write head means to wrap said magnetic tape, as guided past said read/write head means by said first movable guide means, about said read/write head means.

12. The apparatus of claim 7 wherein said tape threading means comprises:

tape threading pin means for engaging said leader block; and rack and pinon gear means for translating said tape threading pin means along a predetermined substantially linear path from said magnetic tape cartridge to said takeup reel means.

13. The apparatus of claim 12 wherein said tape threading means further comprises:

means for supporting said rack and pinon gear means in a predetermined position in said tape drive; and aperture means, formed in said means for supporting and receiving said tape threading pin means, for defining said predetermined path.

14. A tape transport apparatus for reading and writing data on to a magnetic tape that is supplied in a removable tape cartridge, containing a single reel rotatably mounted within said magnetic tape cartridge, and having a leader block affixed to one end of said magnetic tape for use in withdrawing said one end from said magnetic tape cartridge, comprising:

frame means, having a width dimension not to exceed 5¼ inches and a depth dimension;

takeup reel means permanently rotatably mounted in said tape transport apparatus on said frame means, located proximate a first extreme edge of said width dimension and proximate a first extreme edge of said depth dimension, having an aperture formed therein located substantially opposite said leader block when said magnetic tape cartridge is loaded in said tape drive, for receiving said leader block;

tape threading means for grasping said leader block to thread said magnetic tape along a predetermined path from said magnetic tape cartridge to said takeup reel means;

read/write head means, mounted on said frame means, located proximate a second extreme edge of said width dimension and proximate a first extreme edge of said depth dimension wherein said second extreme edge of said width dimension is opposite said first extreme edge of said width dimension, for reading and writing data on to said magnetic tape; and tape wrap means for translating said threaded magnetic tape from said predetermined path along a tape wrap path at least 180° around a circumference of said takeup reel means to traverse a space between said takeup reel means and said read/write head means and thence to wrap about said read/write head means.

15. The apparatus of claim 14 wherein said tape wrap means comprises:

first movable guide means that is movable between a first position located juxtaposed to said takeup reel means and a second position located juxtaposed said takeup reel means along a path that guides said magnetic tape past said read/write head means.

16. The apparatus of claim 15 wherein said tape wrap means further comprises:

second and third movable guide means that are movable between a first position located juxtaposed to said takeup reel means and a second position framing said read/write head means to wrap said magnetic tape, as guided past said read/write head means by said first movable guide means, about said read/write head means.

17. The apparatus of claim 14 wherein said tape threading means comprises:

tape threading pin means for engaging said leader block; and rack and pinon gear means for translating said tape threading pin means along a predetermined substantially linear path from said magnetic tape cartridge to said takeup reel means.

18. The apparatus of claim 17 wherein said tape threading means further comprises:

means for supporting said rack and pinon gear means in a predetermine position in said tape drive; and aperture means, formed in said means for supporting and receiving said tape threading pin means, for defining said predetermined path.

* * * * *